United States Patent
Lewis

(10) Patent No.: US 6,813,883 B1
(45) Date of Patent: Nov. 9, 2004

(54) SYSTEM AND METHOD FOR CONTROLLING ENGINE AIR/FUEL RATIO DURING HYDROCARBON TRAP PURGING

(75) Inventor: Donald J. Lewis, Brighton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 09/783,352

(22) Filed: Feb. 14, 2001

(51) Int. Cl.$^7$ ............................................. F01N 3/00
(52) U.S. Cl. .................... 60/289; 60/274; 60/285; 60/297; 60/295; 60/293
(58) Field of Search .................. 60/274, 285, 295, 60/297, 289, 293

(56) References Cited

U.S. PATENT DOCUMENTS

| | | | |
|---|---|---|---|
| 3,842,600 A | * 10/1974 | Nakajima et al. | ............. 60/301 |
| 3,896,616 A | * 7/1975 | Keith et al. | .................... 60/289 |
| 4,240,254 A | * 12/1980 | Nakase et al. | ................ 60/299 |
| 5,315,824 A | * 5/1994 | Takeshima | ................... 60/297 |
| 5,373,696 A | 12/1994 | Adamczyk, Jr. et al. | |
| 5,379,586 A | 1/1995 | Honji et al. | |
| 5,388,405 A | 2/1995 | Fujishita et al. | |
| 5,524,433 A | 6/1996 | Adamczyk, Jr. et al. | |
| 5,603,215 A | 2/1997 | Sung et al. | |
| 5,687,565 A | * 11/1997 | Modica et al. | ................ 60/297 |
| 5,867,982 A | * 2/1999 | Tengblad et al. | ............. 60/289 |
| 5,887,422 A | * 3/1999 | Abe et al. | ...................... 60/297 |
| 5,910,293 A | * 6/1999 | Hemingway et al. | ......... 60/295 |
| 5,916,129 A | * 6/1999 | Modica et al. | ................ 60/297 |
| 6,000,217 A | 12/1999 | Hochmuth | |
| 6,029,441 A | * 2/2000 | Mizuno et al. | ............... 60/289 |
| 6,185,933 B1 | * 2/2001 | Tsuzuki et al. | .............. 60/297 |
| 6,354,078 B1 | * 3/2002 | Karlsson et al. | ............. 60/289 |
| 6,367,246 B1 | * 4/2002 | Hirota et al. | ................. 60/295 |
| 6,446,431 B1 | * 9/2002 | Bruck | ......................... 60/289 |
| 6,497,846 B1 | * 12/2002 | Okada et al. | ................ 60/297 |
| 6,651,424 B1 | * 11/2003 | Twigg | ......................... 60/289 |

* cited by examiner

Primary Examiner—Thomas Denion
Assistant Examiner—Diem Tran
(74) Attorney, Agent, or Firm—Allan J. Lippa

(57) ABSTRACT

A method and system are provided for controlling the air/fuel ratio provided to an internal combustion engine during the time period when a hydrocarbon trap, coupled downstream of time engine, is being purged. In particular, the air/fuel ratio provided to the engine is biased rich of stoichiometry when the downstream hydrocarbon trap is being purged.

13 Claims, 4 Drawing Sheets

SYSTEM AND METHOD FOR CONTROLLING ENGINE AIR/FUEL RATIO DURING HYDROCARBON TRAP PURGING

FIELD OF THE INVENTION

The present invention relates generally to a method and system for controlling air/fuel ratio in an internal combustion engine. More particularly, the invention relates to a method and system for adjusting the air/fuel ratio of an internal combustion engine during a time period when a hydrocarbon trap, which is coupled to the engine, is being purged.

BACKGROUND

Certain automotive vehicles are equipped with emission control devices, commonly referred to as hydrocarbon (HC) traps, that adsorb hydrocarbons when the temperature of the device is below a certain level and release and oxidize the stored hydrocarbons when the temperature of the device rises above a certain level. HC traps are particularly useful in a vehicle's exhaust system in combination with a three-way catalytic converter (a "TWC") positioned upstream of the HC trap. In steady-state operation, conventional three-way catalysts store oxidants (NOx and oxygen) when the engine is operated with a lean air/fuel ratio and release the oxidants when the engine is operated with a rich air/fuel ratio. The released oxidants react with the incoming HC and CO (produced when the engine is operated with a rich air/fuel ratio) to form $H_2O$ and $CO_2$. In this way, HC and CO are oxidized and $NO_x$ is reduced. However, conventional three-way catalysts are relatively ineffective below a certain temperature. Therefore, HC traps are sometimes used in the same exhaust system with three-way catalysts to store the HC produced by the engine during and after initial start-up and prior to the three-way catalyst reaching a temperature at which it can effectively reduce NOx and oxidize HC and CO.

When the temperature of an HC trap reaches a certain purge threshold temperature, the HC trap begins to release the HC that it stored when the temperature of the HC trap was relatively low. As with three-way catalysts, the released HC reacts with oxygen in the exhaust stream to form $H_2O$ and $CO_2$. To minimize the amount of unreacted HC that is emitted into the atmosphere, it is important to ensure that there is sufficient oxygen present in the exhaust stream entering the HC trap to oxidize as much of the released HC as possible. As described herein, one method to ensure that sufficient oxygen reaches the HC trap is to use an air pump to pump air into the exhaust stream just upstream of the HC trap.

Three-way catalysts are generally known to reduce NOx more efficiently when the engine is operated with an air/fuel ratio that is rich of stoichiometry. This is because HC and CO are produced by the engine when it is operated with a rich air/fuel ratio, and the HC and CO that enter the three-way catalyst re act with and reduce the stored NOx. Therefore, for purposes of NOx reduction, it is generally desirable to operate the engine somewhat rich of stoichiometry. However, engine control strategies do not typically operate the engine with a rich air/fuel mixture for an extended period of time for various reasons, including the fact that the excessive HC and CO production and emissions would be undesirable. In particular, while abundant HC and CO in the exhaust stream (due to extended rich engine operation) would virtually eliminate NOx emissions, there would not typically be sufficient oxygen in the exhaust stream to oxidize the HC and CO.

The inventors have recognized that it is desirable to utilize engine control strategies t ha t enable the three-way catalyst to efficiently reduce $No_x$ while, at the same time, avoid the risk of increased hydrocarbon emissions into the atmosphere.

SUMMARY OF THE INVENTION

The present invention is directed to an improved method and system for controlling the air/fuel ratio supplied to an internal combustion engine that more efficiently reduces NOx emissions during the purging of an HC trap without increasing HC and CO breakthrough. An internal combustion engine is coupled to an exhaust system that includes a three-way catalytic converter positioned downstream of the engine. A hydrocarbon (HC) trap is positioned in the exhaust stream downstream of the three-way catalyst. An air pump is connected to the exhaust stream between the three-way catalyst and the HC trap and is capable of selectively providing air mass to the exhaust stream in response to a control signal from an electronic controller. When it is determined that the HC trap has reached its purge temperature threshold, the controller causes the air pump to provide air to the exhaust stream entering the HC trap. In that way, it is assured that sufficient oxygen will be present in the exhaust stream to oxidize the hydrocarbons released from the HC trap. In fact, the additional air provided by the air pump into the exhaust stream results in an abundance of oxygen in the exhaust stream while the HC trap is being purged.

Because of the abundance of oxygen in the exhaust stream when the HC trap is being purged, the inventor hereof has determined that it is beneficial to control the engine air/fuel ratio to the rich side of stoichiometry while the HC trap is being purged. With the engine air/fuel ratio being somewhat rich, the three-way catalyst will more efficiently reduce NOx. Furthermore, because of the abundance of oxygen in the exhaust stream downstream of the three-way catalyst, any HC and CO that break through the three-way catalyst will be oxidized downstream. As a result, the NOx reduction efficiency of the three-way catalyst can be increased without increasing HC/CO emissions into the atmosphere during the time period when the HC trap is being purged.

Therefore, according to the present invention, when it is determined that the temperature of the HC trap has risen to the purge temperature threshold, the controller causes the air pump to air/fuel ratio provided to the engine cylinders to be biased rich of stoichiometry. The controller maintains this rich bias throughout the period when the HC trap is being purged.

DETAILED DESCRIPTION OF A PREFERRED EMBODIMENT

Figure 1:
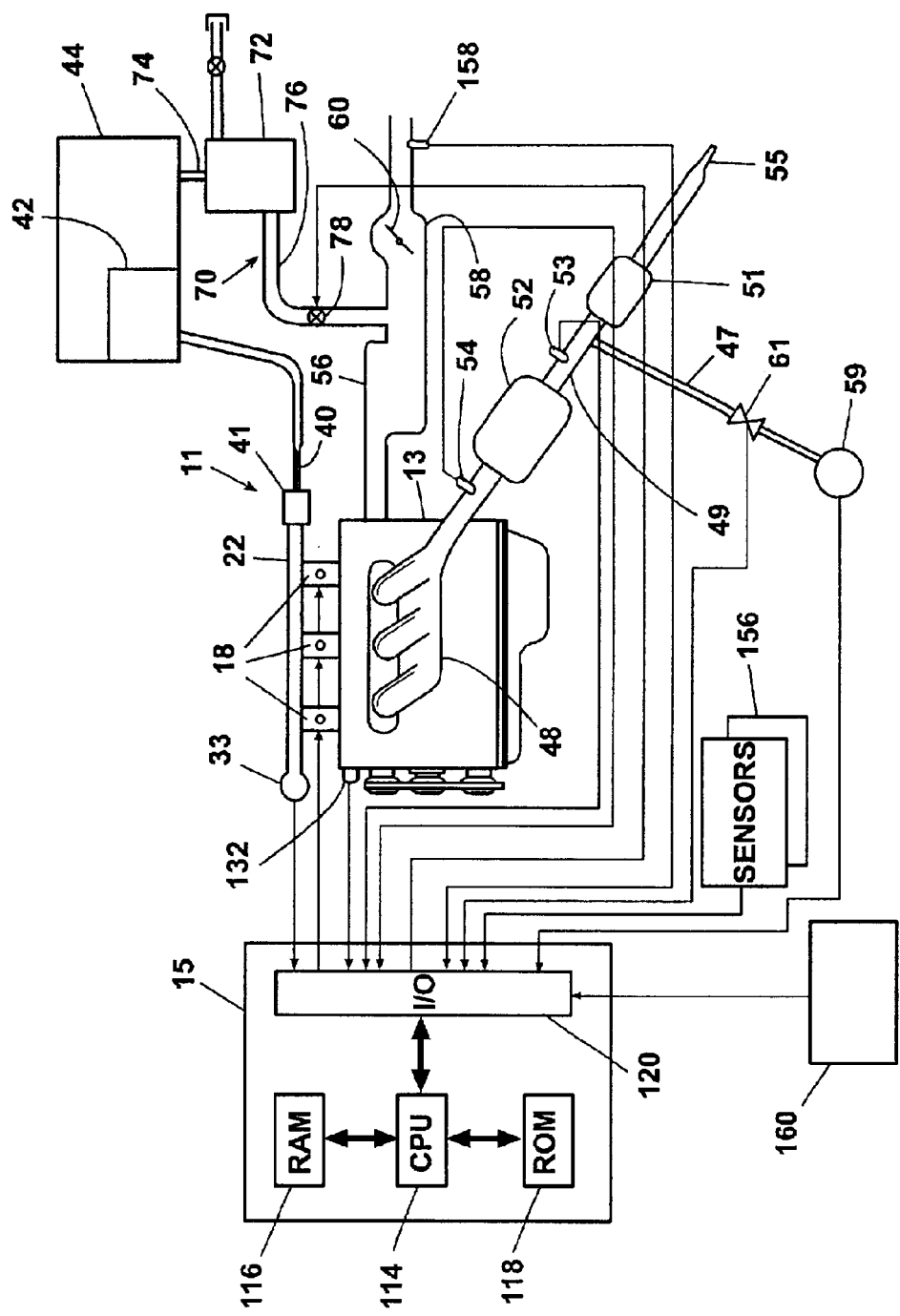
FIG. 1 illustrates a representative internal combustion engine and coupled exhaust system, according to a preferred embodiment of the invention.

Fuel delivery system 11, shown in FIG. 1, of a conventional automotive internal combustion engine 13 is controlled by controller 15, such as an EEC or PCM. Engine 13 comprises fuel injectors 18, which are in fluid communication with fuel rail 22 to inject fuel into the cylinders (not shown) of engine 13, and temperature sensor 132 for sensing temperature of engine 13. Fuel delivery system 11 has fuel rail 22, fuel rail pressure sensor 33 connected to fuel rail 22, fuel line 40 coupled to fuel rail 22 via coupling 41, fuel delivery system 42, which is housed within fuel tank 44, to selectively deliver fuel to fuel rail 22 via fuel line 40.

Engine 13 also comprises exhaust manifold 48 coupled to exhaust ports of the engine (not shown). Catalytic converter 52 is coupled to exhaust manifold 48. A first conventional exhaust gas oxygen (EGO) sensor 54 is positioned upstream of catalytic converter 52 in exhaust manifold 48. A second conventional exhaust gas oxygen (EGO) sensor 53 is positioned downstream of catalytic converter 52 in exhaust pipe 49. The present invention is applicable, however, to a system employing any type of sensor that is capable of measuring a parameter indicative of an air/fuel ratio. Hydrocarbon (HC) trap 51 is positioned downstream of catalytic converter 52 and EGO sensor 53, and upstream of tailpipe 55. HC trap 51 stores hydrocarbons present in the engine exhaust when the HC trap is relatively cool and oxidizes hydrocarbons when the temperature of the HC trap exceeds a particular HC purge threshold temperature. The HC trap 51 tends to be relatively cool when the vehicle is started cold, and it is gradually warmed by incoming exhaust gasses produced by the engine 13. Purge air pump 59 is positioned so as to provide air to the exhaust stream 49 through purge valve 61 and conduit 47. Other types of devices capable of selectively providing air mass in response to a control signal may be used in place of air pump 59.

Engine 13 further comprises intake manifold 56 coupled to throttle body 58 having throttle plate 60 therein. Intake manifold 56 is also coupled to vapor recovery system 70. Vapor recovery system 70 comprises charcoal canister 72 coupled to fuel tank 44 via fuel tank connection line 74. Vapor recovery system 70 also comprises vapor control valve 78 positioned in intake vapor line 76 between intake manifold 56 and charcoal canister 72.

Controller 15 has CPU 114, random access memory 116 (RAM), computer storage medium 118 (ROM), having a computer readable code encoded therein, which is an electronically programmable chip in this example, and input/output (I/O) bus 120. Controller 15 controls engine 13 by receiving various inputs through I/O bus 120, such as fuel pressure in fuel delivery system 11, as sensed by pressure sensor 33; relative exhaust air/fuel ratio as sensed by EGO sensor 54 and EGO sensor 53; temperature of engine 13 as sensed by temperature sensor 132; measurement of inducted mass airflow (MAF) from mass airflow sensor 158; speed of engine (RPM) from engine speed sensor 160; and various other sensors 156. Controller 15 also creates various outputs through I/O bus 120 to actuate the various components of the engine control system. Such components include fuel injectors 18, fuel delivery system 42, vapor control valve 78, air pump valve 61 and air pump 59. It should be noted that the fuel may be liquid fuel, in which case fuel delivery system 42 is an electronic fuel pump.

Fuel delivery control system 42, upon demand from engine 13 and under control of controller 15, pumps fuel from fuel tank 44 through fuel line 40, and into pressure fuel rail 22 for distribution to the fuel injectors during conventional operation. Controller 15 controls fuel injectors 18 via an electronic A/F control signal to maintain a desired air/fuel (A/F) ratio. The A/F control signal is a function of various parameters, including engine speed and load, as well as feedback signals received from pre-catalyst EGO sensor 54 and post-catalyst EGO sensor 53. As illustrated herein, the A/F control signal is also influenced by the HC purge methodology that is the subject of this invention.

Figure 2A:
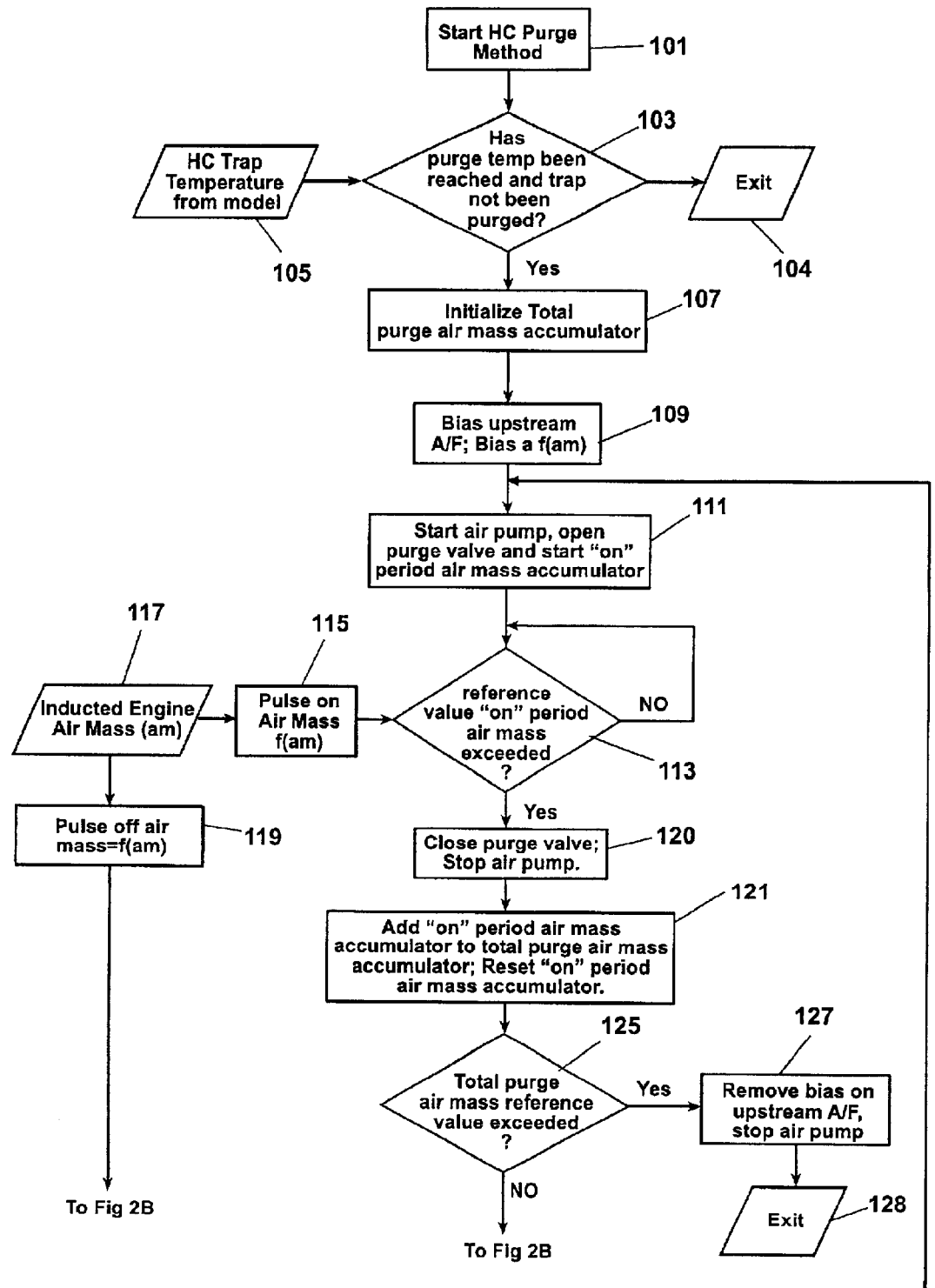
FIGS. 2–3 are flowcharts illustrating steps of the invented method, according to a preferred embodiment of the invention.
Figure 2B:
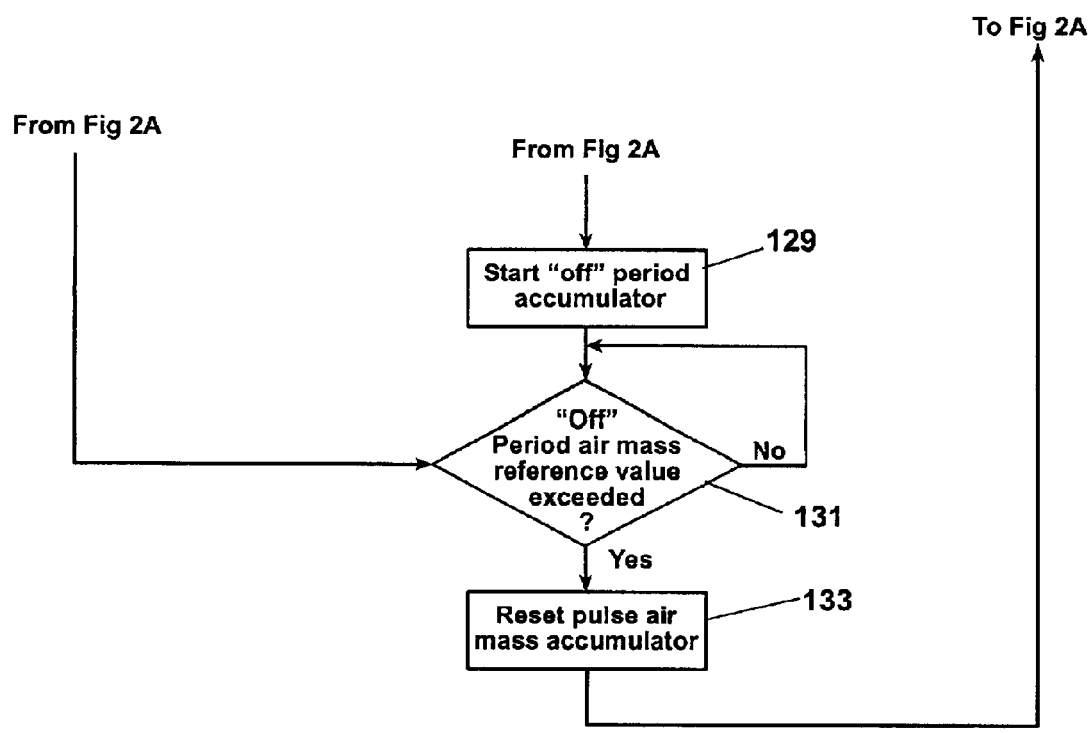
Figure 3:
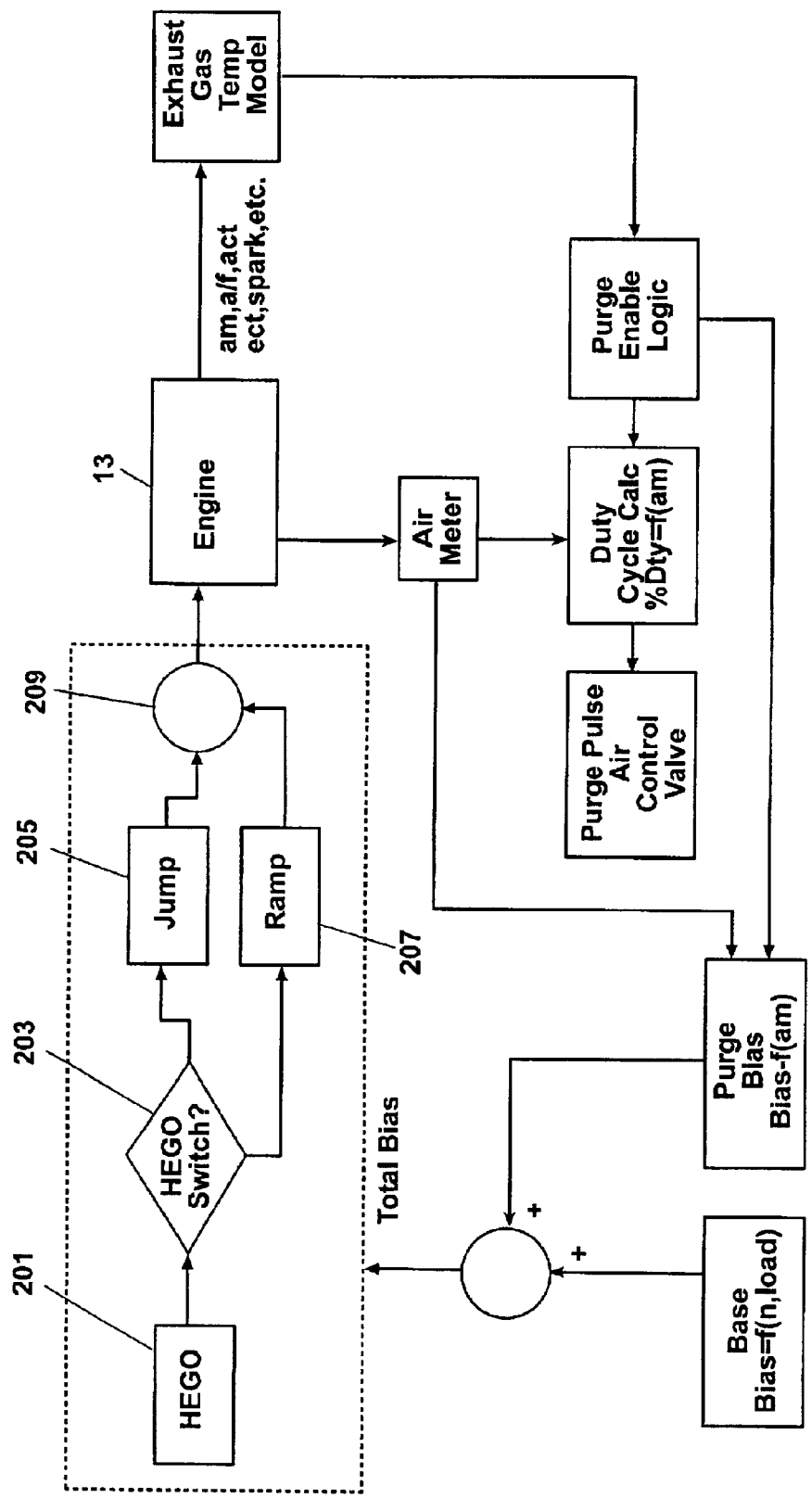

Referring to FIGS. 2A and 2B, a preferred embodiment of the present invention will now be described. The HC purge method is started at block 101 in FIG. 2. At block 103, the controller 15 determines if the current temperature of the HC trap 51 exceeds the purge threshold temperature for the HC trap. The purge threshold temperature, as is commonly know in the art, is that temperature at which the HC trap 51 is capable of releasing and oxidizing the hydrocarbons that were stored in the HC trap while the temperature of the HC trap was relatively low, usually just after vehicle start-up. The current temperature of the HC trap may be determined in a variety of ways, including by directly measuring the HC trap temperature with a conventional temperature sensor or by inferring the current temperature of the HC trap from various engine operating parameters. In the preferred embodiment of the invention, the current temperature of the HC trap 51 is inferred from a temperature model that depends on the speed and load of the engine as well as the engine spark and engine air/fuel ratio (block 105). The exhaust gas temperature is estimated by using an exhaust gas temperature estimation model, as described in U.S. Pat. No. 5,414,994 and U.S. Pat. No. 6,116,083, the collective teachings of which are hereby incorporated by reference. The models described in the '994 patent and the '083 patent provide an estimation of the exhaust gas temperature based on various operating parameters. In the present invention, the exhaust gas temperature estimation is used to infer the temperature of the HC trap.

If the current temperature (either measured or inferred) of the HC trap 51 is below the purge threshold temperature, then the algorithm is stopped (block 104) because the HC trap is not yet capable of oxidizing the stored hydrocarbons. If, on the other hand, the temperature of the HC trap exceeds the purge threshold temperature, then the controller 15 causes the system to begin purging the HC trap, as described below.

As shown in block 107, the controller initializes a total purge air mass accumulator variable in the controller's RAM. The total purge air mass accumulator maintains a running total during the purge process of the air mass that has been provided to the exhaust stream by the air pump 59. This value is constantly maintained and monitored to determine when the HC trap has been completely purged, as described below.

Then, as shown at block 109, the controller 15 calculates a rich purge A/F bias to be applied to the A/F control signal based upon the mass airflow in the intake manifold 56. Specifically, the controller 15 receives feedback data indicative of mass airflow in the intake manifold 56 from mass airflow (MAF) sensor 158. Controller 15 calculates a purge A/F bias that is rich of stoichiometry based upon the mass airflow feedback data. The magnitude of the purge A/F bias can be determined in a variety of ways, including according to various formulas and the like. In a preferred embodiment of the invention, the purge A/F bias is read from a one-dimensional map stored in the controller's ROM that provides a particular rich purge A/F bias as a function of air mass in the intake manifold 56. The purge A/F bias values that comprise the map are determined empirically and programmed into the controller's ROM during manufacture. The purge A/F bias values are chosen so as to maximize the $NO_x$ reduction efficiency of the catalyst 52 without causing excessive HC/CO breakthrough.

The rich purge A/F bias is applied to the A/F control signal to cause the air/fuel ratio in the engine cylinders to be rich of stoichiometry. The rich A/F ratio in the engine cylinders causes the engine 13 to produce HC and CO emissions, as opposed to NOx emissions, which the engine 13 produces during periods of lean A/F operation. Operating the engine 13 rich of stoichiometry enables the catalyst 52 to more efficiently control NOx emissions. This is because of the known phenomena that automotive catalysts store oxidants (NOx and $O_2$) during periods of lean engine operation and release the stored oxidants during periods of rich engine operation. The NOx and $O_2$ that are released from the catalyst 52 during periods of rich engine operation react with the incoming HC and CO to reduce the NOx and oxidize the HC and CO.

Normally, it is important to ensure that the engine 13 is not operated rich of stoichiometry for an extended period of time because an excessive amount of HC and CO production (beyond the amount of oxidants stored by the catalyst 52) will result in HC and CO breakthrough. That is, unreacted HC and CO will pass through the catalyst 52 without being oxidized. This, of course, is an undesirable result. However, according to the present invention, the engine A/F ratio is biased rich of stoichiometry throughout the purging of the HC trap 51. As explained in more detail below, the HC trap 51 is purged by injecting air into the exhaust downstream of the catalyst 52. As a result, a sufficient amount of oxygen will be present in the exhaust downstream of the catalyst 52 to oxidize excess HC and CO breakthrough that may occur due to operating the engine 13 rich of stoichiometry for an extended period of time. Thus, even with some HC and CO passing through the catalyst 52, it will be oxidized prior to being expelled from the vehicle. As a result, by maintaining the rich A/F bias throughout the time period during which the HC trap is being purged, the NOx reduction efficiency of the catalyst 52 is maximized without risking increased HC and CO emissions into the atmosphere.

After the controller 15 calculates and applies a rich purge A/F bias to the A/F control signal (block 109), the controller 15 opens the purge valve 61 and activates the air pump 59 (block 111). The purpose of activating the air pump 59 is to provide additional air to the exhaust 49 entering the HC trap 51 to cause the HC trap 51 to oxidize the stored HC prior to being emitted into the atmosphere. As described above, an additional function of the added air is to oxidize any unreacted HC or CO that pass through the catalyst 52.

To ensure that the HC trap 51 continues to release HC throughout the purge period, it is important to maintain the temperature of the HC trap above the purge threshold temperature. However, the introduction of unheated air into the exhaust will tend to lower the temperature of the exhaust entering the HC trap 51 and thus lower the temperature of the HC trap itself.

Therefore, the inventor hereof has discovered that it is desirable to provide a sufficient air mass to the exhaust to cause the HC trap to oxidize the stored HC, and, at the same time, limit the tendency of the additional air to cool the HC trap 51 below the purge threshold temperature. However, this is difficult to accomplish because air pumps typical of vehicle applications generally provide a constant flow of air mass when activated.

To overcome this limitation of typical air pumps and provide sufficient air to the exhaust stream while, at the same time, limiting the air's cooling effect on the HC trap, the inventor has developed a method of pulsing air from the air pump 59 into the exhaust stream. In particular, according to a Preferred embodiment of the invention, the air pump 59 provides pulses of air through purge valve 61 into the exhaust 49 downstream of catalyst 52 and upstream of HC trap 51 in response to control signals from the controller 15. The air from the air pump 59 is provided to the exhaust stream according to an "on-off" duty cycle, whereby the air pump is maintained "on" for a certain period of time and then held "off" for a certain period of time. This cycle is repeated, as necessary, to provide a desired total air mass to the exhaust stream to completely purge the HC trap 51. By providing the air in a pulsed manner, the HC trap 51 is not subjected to a high concentration of air in a short period of time, and it is possible to better maintain the temperature of the HC trap above the purge threshold temperature.

The controller 15 controls the air pump 59 according to an "on-off" duty cycle by activating the air pump 59 for a particular period of time, i.e., the "on" period, until it is determined that the air pump 59 has provided a certain air mass. Then, the controller 15 de-activates the air pump 59 for a period of time, i.e., the "off" period. This "on-off" cycle is repeated as necessary until the air pump 59 has supplied a sufficient amount of air to completely purge a full HC trap. In particular, the controller 15 controls the air pump 59 as follows.

The controller 15 initializes an "on period" air mass accumulator variable in the controller's RAM (block 111). The "on" period air mass accumulator variable maintains a running total of the air mass that has been provided by the air pump 59 during the current "on" period. As shown in block 113, the controller 15 compares the "on" period air mass accumulator variable to a calculated "on" period air mass reference value to determine whether or not to maintain the air pump in the "on" state. If the value of the "on" period air mass accumulator variable is less than the "on" period .reference value, then the air pump 59 is kept on. If, on the other hand, the value of the "on" period air mass accumulator variable exceeds the "on" period reference value, then the air pump 59 is turned off. If the air pump 59 is turned off, this ends the "on" period of a single "on-off" duty cycle.

As shown in blocks 117 and 115, the "on" period reference value is determined based upon the air mass in the intake manifold 56. In other words, the length of the "on" cycle at a given time is dependent upon the air mass in the intake manifold 56. Though the "on" cycle reference value can be determined in a variety of ways, in a preferred embodiment of the invention, the "on" cycle reference value is read from a one-dimensional map that is stored in the controller's ROM. In particular, for a given intake manifold air mass, a corresponding "on" cycle reference value is provided. In the preferred embodiment of the invention, the intake manifold air mass that is used to derive a corresponding "on" period reference value is measured by mass airflow sensor 158 (block 117).

When-the "on" period of the duty cycle is complete, the controller causes the purge valve 61 to close and the air pump 59 to stop pumping air (block 120). Then, the, value of the "on" period air mass accumulator is added to the total purge air mass accumulator, and then the "on" period air mass accumulator is reset to zero (block 121). In this way, the total purge air mass accumulator is updated after the "on" period is complete. Then, the controller 15 compares the total purge air mass accumulator variable, i.e., the current total amount of air mass supplied to the exhaust by the air pump 59 during various "on" periods, to a total purge air mass reference value. The total purge air mass reference value represents the total amount of air mass required to purge the HC trap 51 when it is full. In the preferred embodiment of the invention, the total purge air mass reference value is empirically-determined and pre-programmed into the controller's ROM during manufacture, though it is possible and within the scope of this invention to determine the total purge air mass reference value dynamically and with regard to feedback parameters. If the current total air mass supplied to the exhaust stream exceeds the total purge air mass reference value, then it is determined that the HC trap 51 has been fully purged. Therefore, the controller 15 removes the rich purge A/F bias and de-activates the air pump 59 (block 127), after which the HC trap purge method is complete (block 128).

If the current total air mass supplied to the exhaust stream does not exceed the total purge air mass reference value, then it is determined that the HC purge is not complete. Accordingly, the controller maintains the air pump 59 in the "off" state for a period of time to complete the "off" period of the "on-off" duty cycle. Specifically, the controller 15 starts incrementing an "off" period accumulator variable (block 29) to establish the "off" period of the "on-off" duty cycle. The controller 15 compares the "off" period accumulator variable to an "off" period reference value (block 131). Like the "on" period reference value, the "off" period reference value is derived from a one-dimensional map that provides an "off" period reference value corresponding to a given air mass value in the intake manifold 56 (measured by the air mass sensor 158), as shown in blocks 117 and 119. The magnitude of the "off" period reference value determines the length of the "off" period of the "on-off" duty cycle. Specifically, the controller maintains the air pump 59 in the "off" state until the current value of the "off" period accumulator variable exceeds the "off" period reference value (block 131). When this occurs, the "off" period of the duty cycle is complete. Then, the controller resets the "off" period accumulator variable (block 133) to zero. The various "off" period reference values are empirically-determined and pre-programmed into the controller's ROM.

After the "off" period is complete, one cycle of the "on-off" duty cycle is complete. Thereafter, the controller 15 repeats steps 111 through 133, as necessary, until it is determined that the HC trap has been completely purged.

In essence, blocks 111 through 133 of FIG. 1 set forth details as to how air from the air pump 59 is pulsed into the exhaust 49, according to a preferred embodiment of the invention. As previously described, the lengths of the "on" periods and "off" periods of the "on-off" duty cycle used to control the air pump are determined from respective one-dimensional maps (blocks 115, 119) that depend on the measured air mass in the intake manifold 56 (block 117). It is desirable that the "on" period reference values and the "off" period reference values be programmed so that a sufficient air mass is provided during the "on" period of the duty cycle to purge the HC trap 51 and oxidize breakthrough HC, and, at the same time, the "off" period is sufficiently long to prevent the temperature of the HC trap 51 from falling below the purge temperature threshold. The inventor has determined that the programmed "on" period and "off" period reference values should be approximately directly proportional to the air mass measured in the intake manifold 56. That is, when the air mass measured in the intake manifold is relatively large, then the length of the "on" period of the duty cycle will be relatively longer and the "off" period of the duty cycle will be relatively shorter, though not necessarily to the same degree. Because a relatively large air mass in the intake manifold usually corresponds to a relatively rich A/F ratio provided to the engine (due to higher loads), the engine will be producing HC and CO (as opposed to NOx). Accordingly, additional air from the air pump 59 is desirable to ensure that the purging of the HC trap continues and any HC/CO breakthrough from the catalyst 52 is oxidized in the exhaust 49. Further, under higher load conditions, the engine generally produces greater amounts of thermal energy. So, it is less likely that the purge air from the air pump 59 will cool the HC trap 51 below the purge threshold temperature, thus permitting the "off" periods to be of shorter duration. Indeed, depending on the circumstances, it is possible for the air pump 59 to be maintained "on" throughout the entire period when the engine is operated under a relatively heavy load.

Conversely, a relatively low air mass in the intake manifold 56 usually corresponds to a relatively lean A/F ratio in the engine, thereby producing NOx instead of HC and CO. Under these circumstances, oxygen is relatively abundant in the exhaust 49. Because less additional oxygen is required to purge the HC trap 51, the length of the "on" period can be shortened and the length of the "off" period can be lengthened. Further, because the engine generally produces a lower amount of thermal energy under relatively lower loads, longer "off" periods are desirable to prevent the additional air from cooling the HC trap 51 too much.

Preferred embodiments of the present invention have been disclosed. A person of ordinary skill in the art would realise, however, that certain modifications would come within the teachings of this invention. Therefore, the following claims should be studied to determine the true scope and content of the invention.

What is claimed is:

1. A method for controlling an air-fuel mixture in an internal combustion engine, comprising:
    determining a temperature of a downstream emission control device, said downstream emission control device located following an upstream emission control device;
    oxidizing hydrocarbons stored in said downstream emission control device when said temperature of said downstream emission control device is greater than a predetermined temperature by providing an air amount in a location following said upstream emission control device and before said downstream emissions device, where said air amount is provided by an air pump, and wherein said oxidizing hydrocarbons is accomplished by adjusting said air pump to provide a varying amount of air mass to said downstream device to oxidize hydrocarbons without lowering said temperature of said downstream device below a predetermined threshold; and
    adjusting the air/fuel ratio in the engine rich of stoichiometry during oxidation of said hydrocarbons.

2. The method of claim 1, wherein said air pump is activated when said determined temperature is greater than a preselected threshold.

3. The method of claim 1 wherein said air-fuel is adjusted by providing a bias to a desired air-fuel ratio.

4. The method of claim 3 wherein said bias is based on an air mass in the intake manifold.

5. The method of claim 1 wherein said air amount is increased as engine load increases.

6. A system controlling an air-fuel ratio in an internal combustion engine, comprising:
    a hydrocarbon trap positioned in an exhaust path downstream of a first emission control device, said first emission control device being located downstream of said engine;
    an air supply device positioned downstream of said first emission control device to supply air upstream of said hydrocarbon trap; and a controller configured to activate said air supply device when temperature of said hydrocarbon trap is greater than a predetermined temperature, thereby, delivering oxygen to said hydrocarbon trap when temperature of said hydrocarbon trap is greater than said predetermined temperature, said controller further configured to adjust an air/fuel ratio in said engine rich of stoichiometry during said air delivery and to adjust said air supply device to vary an amount of oxygen delivered to said hydrocarbon trap to prevent said temperature of said hydrocarbon trap from falling below a threshold value by pulsing said air supply device.

7. The system of claim 6, wherein said air supply device is an air pump.

8. A method for controlling an engine, said engine communicating with a first emission control device, said first emission control device communicating with a second emission control device, said method comprising:

determining a temperature of said second emission control device;

combusting an air-fuel mixture rich of stoichiometry in an engine cylinder to reduce NOx stored in said first emission control device; and applying oxygen upstream of said second emission control device to oxidize hydrocarbons stored in said second emission control device and hydrocarbons from said combusted rich air-fuel mixture when said determined temperature of said second emission control device is greater than a predetermined temperature, where an amount of said oxygen applied upstream of said second emission control device is provided by a pump, and said amount is varied based on said determined temperature by pulsing said pump.

9. The method of claim 8 wherein said oxygen is applied to an exhaust gas stream passing through said emission control devices in only one location of said exhaust gas stream.

10. A method for controlling an air-fuel mixture in an internal combustion engine, comprising:

determining a temperature of a downstream emission control device located following a upstream emissions control device;

commencing oxidizing hydrocarbons stored in said downstream device when said temperature of said downstream device is greater than a predetermined temperature by providing a predetermined air mass in a location following said upstream emissions control device and before said downstream emissions device, wherein said oxidizing hydrocarbons is accomplished by providing a sufficient air mass to said downstream device without lowering the temperature of said downstream device below a predetermined threshold; and adjusting the air-fuel ratio in the engine rich of stoichiometry during oxidation of said hydrocarbons.

11. The method of claim 10 wherein said air-fuel is adjusted by providing bias to a desired air-fuel ratio.

12. The method of claim 11 wherein said bias is based on an air mass in the intake manifold.

13. The method of claim 10 wherein said predetermined air mass is provided by an air pump.

* * * * *